US008686057B2

(12) United States Patent
Van der Wal et al.

(10) Patent No.: US 8,686,057 B2
(45) Date of Patent: Apr. 1, 2014

(54) POLYURETHANES MADE FROM HYDROXY-METHYL CONTAINING FATTY ACIDS OR ALKYL ESTERS OF SUCH FATTY ACIDS

(75) Inventors: Hanno R. Van der Wal, Hoek (NL); Camiel F. Bartelink, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 1210 days.

(21) Appl. No.: 11/663,466

(22) PCT Filed: Oct. 24, 2005

(86) PCT No.: PCT/US2005/038217
§ 371 (c)(1),
(2), (4) Date: Jun. 25, 2009

(87) PCT Pub. No.: WO2006/047433
PCT Pub. Date: May 4, 2006

(65) Prior Publication Data
US 2009/0264548 A1 Oct. 22, 2009

Related U.S. Application Data

(60) Provisional application No. 60/622,220, filed on Oct. 25, 2004.

(51) Int. Cl.
*C08G 18/28* (2006.01)

(52) U.S. Cl.
USPC ........... 521/173; 521/126; 521/127; 521/163; 521/164; 521/167; 521/172; 528/58; 528/74.5; 528/84; 528/85

(58) Field of Classification Search
USPC ......... 521/126, 127, 163, 164, 167, 172, 173; 528/58, 74.5, 84, 85
See application file for complete search history.

(56) References Cited

U.S. PATENT DOCUMENTS

| | | | |
|---|---|---|---|
| 2,866,744 A | 12/1958 | Askey et al. | |
| 3,278,457 A | 10/1966 | Milgrom | |
| 3,278,458 A | 10/1966 | Belner | |
| 3,278,459 A | 10/1966 | Herold | |
| 3,404,109 A | 10/1968 | Milgrom | |
| 3,427,256 A | 2/1969 | Milgrom | |
| 3,427,334 A | 2/1969 | Belner | |
| 3,427,335 A | 2/1969 | Herold | |
| 3,637,540 A * | 1/1972 | Wolff et al. | 521/167 |
| 3,755,212 A | 8/1973 | Dunlap et al. | |
| 3,821,130 A | 6/1974 | Barron et al. | |
| 3,849,156 A | 11/1974 | Marlin et al. | |
| 3,914,189 A * | 10/1975 | Rudner et al. | 521/128 |
| 4,242,249 A | 12/1980 | Van Cleve et al. | |
| 4,350,780 A | 9/1982 | Van Cleve et al. | |
| 4,383,050 A * | 5/1983 | Nissen et al. | 521/174 |
| 4,390,645 A | 6/1983 | Hoffman et al. | |
| 4,423,162 A | 12/1983 | Peerman et al. | |
| 4,460,715 A | 7/1984 | Hoffman et al. | |
| 4,496,487 A | 1/1985 | Peerman et al. | |
| 4,543,369 A | 9/1985 | Peerman et al. | |
| 4,561,922 A | 12/1985 | Peerman et al. | |
| 4,633,021 A | 12/1986 | Hanes | |
| 4,731,486 A | 3/1988 | Abatjoglou et al. | |
| 4,745,153 A | 5/1988 | Hoffman | |
| 4,831,076 A | 5/1989 | Lidy et al. | |
| 4,843,054 A | 6/1989 | Harper | |
| 5,300,535 A | 4/1994 | Takeyasu et al. | |
| 5,451,631 A | 9/1995 | Guo | |
| 5,470,813 A | 11/1995 | Le-Khac | |
| 5,494,957 A | 2/1996 | Moore et al. | |
| 5,498,651 A | 3/1996 | Brunelle | |
| 5,547,984 A | 8/1996 | Sharma | |
| 5,552,486 A | 9/1996 | Guo et al. | |
| 5,627,120 A | 5/1997 | Le-Khac | |
| 5,648,559 A | 7/1997 | Hager | |
| 5,786,514 A | 7/1998 | Shen et al. | |
| 5,811,566 A | 9/1998 | Watabe et al. | |
| 5,854,386 A | 12/1998 | Shen et al. | |
| 5,856,369 A | 1/1999 | Jorgenson et al. | |
| 5,908,701 A | 6/1999 | Jennings et al. | |
| 5,981,613 A * | 11/1999 | Cobb et al. | 521/112 |
| 6,018,017 A | 1/2000 | Le-Khac | |
| 6,075,064 A | 6/2000 | Muller et al. | |
| 6,255,537 B1 | 7/2001 | Hayashi et al. | |
| 6,355,845 B1 | 3/2002 | Clement et al. | |
| 6,372,810 B2 | 4/2002 | Kazmierski et al. | |
| 6,429,342 B1 | 8/2002 | Clement et al. | |
| 6,552,163 B1 | 4/2003 | Clement et al. | |
| 7,125,950 B2 * | 10/2006 | Dwan'Isa et al. | 528/74.5 |

(Continued)

FOREIGN PATENT DOCUMENTS

| | | |
|---|---|---|
| EP | 0397036 | 11/1990 |
| EP | 0763555 | 3/1997 |

(Continued)

OTHER PUBLICATIONS

U.S. Appl. No. 11/663,528, filed Mar. 22, 2007.

(Continued)

*Primary Examiner* — John Cooney
(74) *Attorney, Agent, or Firm* — Whyte Hirschboeck Dudek S.C.

(57) ABSTRACT

Polyurethane polymers are made from a reaction mixture that contains a polyisocyanate, a hydroxylmethyl-containing fatty acid or ester, and another polyol, polyamine or aminoalcohol. The carboxylic acid or ester group on the hydroxymethyl-containing fatty acid or ester are capable of engaging in a variety of reactions with the polyisocyanate and/or amine or hydroxyl groups present in the reaction mixture. This allows for good quality, high molecular weight polymers to be produced even though the hydroxymethyl-containing fatty acid or ester tends to be a low functionality material.

17 Claims, No Drawings

(56) References Cited

U.S. PATENT DOCUMENTS

2003/0225244 A1 12/2003 Nobori et al.
2006/0293400 A1* 12/2006 Wiltz, Jr. et al. .............. 521/172

FOREIGN PATENT DOCUMENTS

| | | |
|---|---|---|
| EP | 1112243 | 7/2001 |
| JP | HEI 5-163342 | 6/1993 |
| WO | WO-98/52988 | 11/1998 |
| WO | WO-2004/020497 | 3/2004 |
| WO | WO-2004/096744 | 11/2004 |
| WO | WO-2004/096882 | 11/2004 |
| WO | WO-2004/096883 | 11/2004 |
| WO | WO-2006/047431 | 5/2006 |
| WO | WO-2006/047432 | 5/2006 |
| WO | WO-2006/047434 | 5/2006 |
| WO | WO-2006/065345 | 6/2006 |

OTHER PUBLICATIONS

U.S. Appl. No. 11/663,529, filed Mar. 22, 2007.
U.S. Appl. No. 11/665,097, filed Apr. 11, 2007.
U.S. Appl. No. 11/665,119, filed Apr. 11, 2007.

* cited by examiner

POLYURETHANES MADE FROM HYDROXY-METHYL CONTAINING FATTY ACIDS OR ALKYL ESTERS OF SUCH FATTY ACIDS

This application claims benefit of U.S. Provisional Application No. 60/622,220, filed Oct. 25, 2004.

This invention relates to polyurethane polymers and methods for making such polymers.

Polyurethanes are produced by the reaction of polyisocyanates and polyols. The first large scale commercial production of polyurethanes arose using polyester polyols from the ester condensation reaction of diols or polyols and dicarboxylic acids to make flexible foams. The polyester polyols were largely supplanted by polyether polyols because of their lower cost and the ability to make a wide range of polyols. Polyethers are made by polymerizing epoxides (oxiranes) derived from petroleum feedstocks in the presence of initiator compounds that contain active hydrogen starting compounds, such as low molecular weight polyols and polyamines. Rigid polyurethane foams have been made with castor oil or castor oil byproducts.

Attempts have been made to make polyols from vegetable or renewable feedstocks such as those disclosed by Peerman et al. in U.S. Pat. Nos. 4,423,162, 4,496,487 and 4,543,369. Peerman et al. describe hydroformylating and reducing esters of fatty acids as are obtained from vegetable oils, and forming esters of the resulting hydroxylated materials with a polyol or polyamine. However, Peerman et al. specifically describe problems of gelling, which he avoided by using no greater than 1 mole of the hydroxymethylated material per equivalent of polyol or polyamine. Consequently, Peerman et al.'s esters are low equivalent weight materials that have been shown to be useful only in making crosslinked rigid polyurethanes.

More recently, there have been developed higher functionality polyester polyol materials that are derived from fatty acids. As described in WO 04/096882 and WO 04/096883, these polyester polyols are made by reacting a polyhydroxyl initiator with certain hydroxymethylated fatty acids. These polyols are finding applications in foam and other polyurethane applications.

It would in certain cases be desirable to provide a lower viscosity material for use in making polyurethanes, as lower viscosity makes processing easier in certain applications.

This invention is in one aspect a process for preparing a polyurethane, comprising forming a reaction mixture comprising at least one polyisocyanate, an unsubstituted or inertly substituted alkyl ester of a fatty acid having an average of at least 0.8 hydroxymethyl group per molecule, and at least one polyol polyamine or aminoalcohol compound, and curing the reaction mixture to form a polyurethane polymer.

The hydroxymethyl group-containing fatty acid ester is generally a low functionality material. As discussed more fully below, these materials are most typically will contain a large fraction of molecules having a single hydroxymethyl group. Thus, these materials tend to react mainly monofunctionally with a polyisocyanate. The presence of significant quantities of monofunctional materials in a polyurethane-forming formulation is normally expected to limit the molecular weight and crosslink density, thereby degrading the physical properties of the product. Surprisingly, however, the fatty acid ester is capable of engaging in a transesterification/transamidization reaction to form ester or amide linkages with the polyol or polyamine, respectively, during the polyurethane-forming reaction or in a subsequent post-curing step. This provides an additional mechanism for building molecular weight and crosslink density, and permits good quality polyurethanes to be prepared despite the presence of low functionality starting materials.

In a second aspect this invention is a process for preparing a polyurethane, comprising forming a reaction mixture comprising at least one polyisocyanate, a fatty acid having an average of at least 0.8 hydroxymethyl group per molecule, and at least one polyol, polyamine or aminoalcohol compound, and curing the reaction mixture to form a polyurethane polymer.

The fatty acid component used in this aspect of the invention is capable of reacting at least difunctionally with a polyisocyanate, at least once through a hydroxymethyl group on the fatty acid backbone and once through the terminal carboxylic acid group. In addition, the fatty acid group can react with the polyol or polyamine component as before to further build molecular weight and crosslink density. The use of the fatty acid material allows one to simplify the preparation of at least some starting materials, by eliminating a previous reaction of the hydroxymethyl-containing fatty acid with a polyol initiator.

The hydroxymethyl group-containing fatty acid useful in this invention advantageously contains from 12 to 26 carbon atoms, and an average of at least 0.8 hydroxylmethyl group per molecule. The esters are esters of these fatty acids, in which the ester group is an unsubstituted alkyl or inertly substituted alkyl group. These hydroxymethyl-containing fatty acids and esters can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transesterification reaction with a lower alkanol, especially methanol or ethanol, to produce alkyl esters of the constituent fatty acids. An inertly substituted lower alkanol can also be used in this step. The resulting alkyl esters may be hydrolyzed to the corresponding fatty acids when it is desired to produce a hydroxymethyl-containing fatty acid. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in WO 04/096744. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation.

Hydroxymethyl-containing fatty acids and esters made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated.

Methods of making such hydroxymethyl-containing fatty acids are described in WO 04/096744.

The hydroxymethyl-containing fatty acids and/or esters are advantageously mixtures of materials having structures A1, A2, A3, A4 and A5 as follow. A1 is:

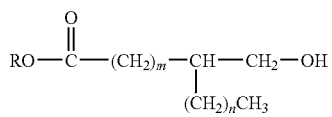

(I)

wherein R is hydrogen, alkyl or inertly substituted allyl, m is number greater than 3, n is greater than or equal to zero and m+n is from 8 to 22, especially from 11 to 19. A2 is:

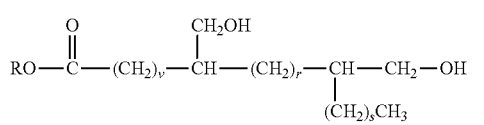

(II)

wherein R is as before, v is a number greater than 3, r and s are each numbers greater than or equal to zero with v+r+s being from 6 to 20, especially 10 to 18. A3 is:

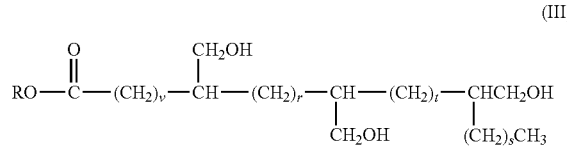

(III)

wherein R, v, each r and s are as defined before, t is a number greater than or equal to zero, and the sum of v, r, s and t is from 5 to 18, especially from 10 to 18. A4 is

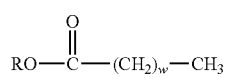

(IV)

where R is as before and w is from 10-24, and A5 is

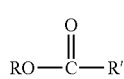

(V)

where R is as before and R' is a linear or branched alkyl group that is substituted with at least one cyclic ether group and optionally one or more hydroxyl groups or other ether groups. The cyclic ether group may be saturated or unsaturated and may contain other inert substitution. The hydroxyl groups may be on the alkyl chain or on the cyclic ether group, or both. The alkyl group may include a second terminal —C(O)— or —C(O)O— group through which it may bond to another initiator molecule. A5 groups in general are lactols, lactones, saturated or unsaturated cyclic ethers or dimers that are formed as impurities during the manufacture of the hydroxylmethyl-group containing fatty acid or ester. A5 groups may contain from 12 to 50 carbon atoms.

The fatty acid or ester is preferably a material of the A1 type, a mixture of materials of the A1 and A2 types, a mixture of materials of the A1 and A4 types, a mixture of materials of the A1, A2 and A4 types, a mixture of materials of the A1, A2 and A3 types, or a mixture of materials of the A1, A2, A3 and A4 types, in each case optionally containing a quantity of A5. Mixtures of A1 and A2 preferably contain A1 and A2 in a mole ratio of 10:90 to 95:5, particularly from 60:40 to 90:10. Mixtures of A1 and A4 preferably contain A1 and A4 in a mole ratio of 99.9:0.1 to 70:30, especially in a ratio of from 99.9:0.1 to 85:15. Mixtures of A1, A2 and A4 preferably contain from about 10 to 95 mole percent A1, 5 to 90 percent A2 and up to about 30 percent A4. More preferred mixtures of A1, A2 and A4 contain from 26 to 70 mole-% A1, from 15 to 40% A2 and up to 30% A4. Mixtures of A1, A2 and A3 preferably contain from 30 to 80 mole-% A1, from 10 to 60% A2 and from 0.1 to 10% A3. Mixtures of A1, A2, A3 and A4 groups preferably contain from 20 to 50 mole percent A1, 1 to about 65 percent A2, from 0.1 to about 10 percent A3 and up to 30 percent A4. Especially preferred fatty acids and esters contain a mixture of from 20 to 50% A1, from 20 to 50% A2, from 0.5 to 4% A3 and from 15 to 30% A4. In all cases, A5 groups advantageously constitute from 0 to 7%, especially from 0 to 5%, of the total weight of the fatty acid or ester material.

Preferred mixtures of A groups conveniently contain an average of about 0.8 to about 1.5 $CH_2OH$ or —$CH_2OB$ groups/A group, such as from about 0.9 to about 1.3 —$CH_2OH$ and/or —$CH_2OB$ groups/A group or from about 0.95 to about 1.2 —$CH_2OH$ and/or —$CH_2OB$ groups/A group.

"Inertly substituted" groups are groups that do not react with an isocyanate groups and which do not otherwise engage in side reactions during the preparation of the hydroxymethyl-group containing fatty acid or ester. Examples of such inert substituents include as aryl, cycloalkyl, silyl, halogen (especially fluorine, chlorine or bromine), nitro, ether, ester, and the like.

A preferred hydroxymethyl group-containing fatty acid is methyl- or ethyl 9(10)-hydroxymethylstearate, which is formed by hydroformylating and hydrogenating a fatty acid ester mixture containing oleic acid (such as is prepared in the above-described transesterification reaction).

The reactive mixture contains at least one other polyol, polyamine or aminoalcohol. Among the suitable polyols are polyether polyols and polyester polyols. Polyether polyols include, for example, polymers of propylene oxide, ethylene oxide, 1,2-butylene oxide, tetramethylene oxide, block and/or random copolymers thereof and the like. Of particular interest are poly(propylene oxide) homopolymers, random copolymers of propylene oxide and ethylene oxide in which the poly(ethylene oxide) content is, for example, from about 1 to about 30% by weight, ethylene oxide-capped poly(propylene oxide) polymers and ethylene oxide-capped random copolymers of propylene oxide and ethylene oxide. For slabstock foam applications, such polyethers preferably contain from 2 to 4, especially from 2 to 3, mainly secondary hydroxyl groups per molecule and have an equivalent weight per hydroxyl group of from about 400 to about 3000, especially from about 800 to about 1750. For high resiliency slabstock and molded foam applications, such polyethers preferably contain from 2 to 4, especially from 2 to 3, mainly primary hydroxyl groups per molecule and have an equivalent weight per hydroxyl group of from about 1000 to about 3000, especially from about 1200 to about 2000. The polyether polyols may contain low terminal unsaturation (for example, less than 0.02 meq/g or less than 0.01 meq/g), such as those made using so-called double metal cyanide (DMC) catalysts, as described for example in U.S. Pat. Nos. 3,278,457, 3,278, 458, 3,278,459, 3,404,109, 3,427,256, 3,427,334, 3,427,335, 5,470,813 and 5,627,120. Polyester polyols typically contain about 2 hydroxyl groups per molecule and have an equivalent weight per hydroxyl group of from 400 to 1500. Suitable polyesters include reaction products of polyols, preferably diols, with polycarboxylic acids or their anhydrides, preferably dicarboxylic acids or dicarboxylic acid anhydrides. Other suitable polyesters include polymers of cyclic lactones such as polycaprolactone.

Amine-terminated polyethers prepared by converting terminal hydroxyl groups on the foregoing polyether and polyester polyols to primary or secondary amine groups can also be used. Amine-terminated polyethers are commercially available as Jeffamine® D-400, D-2000, T-403, and T-5000 from Huntsman Chemical.

Other suitable materials include polyols, polyamines or alkanolamine compounds containing from 2 to 8, especially from 2 to 4 hydroxyl, primary amine and/or secondary amine groups per molecule and having an equivalent weight of from 30 to about 200, especially from 50 to 125. Examples of such materials include diethanol amine, monoethanol amine, triethanol amine, mono- di- or tri(isopropanol) amine, glycerine, trimethylol propane, pentaerythritol, ethylene glycol, diethylene glycol, 1,2-propylene glycol, dipropylene glycol, tripropylene glycol, ethylene diamine, phenylene diamine, bis(3-chloro-4-aminophenyl)methane, cyclohexanedimethanol and 2,4-diamino-3,5-diethyl toluene. Polyethers having an equivalent weight of up to 400 that are prepared by alkoxylating any of the foregoing can also be used.

The selection of the particular polyol, polyamine or aminoalcohol will be made in conjunction with the intended application. As is well known, the use of increasing amounts of lower equivalent weight materials and higher functionality materials tends to form a more rigid polymer, whereas the use of higher equivalent weight materials and lower functionality materials tends to favor the formation of more elastomeric polylurethanes.

Any of the foregoing isocyanate reactive materials (including the hydroxymethyl-containing fatty acid or ester) may contain dispersed polymer particles, such as dispersed polyurea, polyurethane or vinyl polymer particles. These materials are described in a large number of references, of which U.S. Pat. Nos. 4,242,249, 4,350,780, 4,390,645, 4,460,715, 4,745,153, 4,381,076, 5,494,957 and WO 98/52988 are examples.

The hydroxymethyl-containing fatty acid or ester may constitute from 10 to about 50 mole-% of the isocyanate-reactive materials other than water that are present in the reaction mixture. Preferably, the hydroxymethyl-containing polyester polyol constitutes at least 15%, more preferably at least 20 mole-%, up to about 40 and more preferably up to about 30 mole-% of the isocyanate-reactive materials in the reaction mixture, again exclusive of any water that is present in the reaction mixture.

The reaction mixture further contains at least one polyisocyanate compound. Suitable polyisocyanates include aromatic, cycloaliphatic and aliphatic isocyanates. Exemplary polyisocyanates include m-phenylene diisocyanate, tolylene-2,4-diisocyanate, tolylene-2,6-diisocyanate, isophorone diisocyanate, 1,3- and/or 1,4-bis(isocyanatomethyl)cyclohexane (including cis- or trans-isomers of either), hexamethylene-1,6-diisocyanate, tetramethylene-1,4-diisocyanate, cyclohexane-1,4-diisocyanate, hexahydrotolylene diisocyanate, methylene bis(cyclohexaneisocyanate) ($H_{12}$MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4'-diisocyanate, diphenylmethane-2,4-diisocyanate and mixtures thereof are generically referred to as MDI, and all can be used. Tolylene-2,4-diisocyanate, tolylene-2,6-diisocyanate and mixtures thereof are generically referred to as TDI, and all can be used.

Derivatives of any of the foregoing polyisocyanate groups that contain biuret, urea, carbodiimide, allophonate and/or isocyanurate groups can also be used. These derivatives often have increased isocyanate functionalities and are desirably used when a more highly crosslinked product is desired.

The reaction mixture may contain a wide variety of other additives as are conventionally used in making polyurethanes of various types. These include, for example, catalysts, blowing agents, surfactants, cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like. Catalysts are particularly preferred additives, as are blowing agents and surfactants in cases where a cellular polyurethane is desired.

A catalyst is often used to promote the polyurethane-forming reaction. The selection of a particular catalyst package will vary somewhat with the particular application, the particular polymer polyol or dispersion that is used, and the other ingredients in the formulation. The catalyst may catalyze the "gelling" reaction between the polyol(s) and the polyisocyanate and/or, in many polyurethane foam formulation(s), the water/polyisocyanate (blowing) reaction which generates urea linkages and free carbon dioxide to expand the foam. In making water-blown foams, it is typical to use a mixture of at least one catalyst that favors the blowing reaction and at least one other that favors the gelling reaction.

A wide variety of materials are known to catalyze polyurethane forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used. Examples of suitably commercially available surfactants include Niax™ A1 (bis(dimethylaminoethyl)ether in propylene glycol available from GE OSi Silicones), Niax™ B9 (N,N-dimethylpiperazine and N—N-dimethylhexadecylsinine in a polyalkylene oxide polyol, available from GE OSi Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a proprietary tertiary amine/carboxylic salt and bis(2- dimethylaminoethyl)ether in water and a proprietary hydroxyl compound, available from GE OSi Silicones); Niax™ A-300 (a proprietary tertiary amine/carboxylic salt and triethylenediamine in water, available from GE OSi Specialties Co.); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

However, formulations in which the hydroxymethyl-containing fatty acid is present may sometimes require a somewhat greater amount of catalyst, particularly of an amine catalyst, as the fatty acid can react with an amine catalyst to decrease its activity. In addition, adducts of the hydroxymethyl-containing fatty acid and a tertiary amine catalyst can be prepared. These adducts can function as a delayed action or heat-activated catalyst in making polyurethane polymers.

When forming a foam, the reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially from 2.5 to 5 parts by weight water are typically used per 100 parts by weight of isocyanate-reactive materials. Water may also be used in combination with a physical blowing agent, particularly a fluorocarbon or hydrocarbon blowing agent. In addition, a gas such as carbon dioxide, air, nitrogen or argon may be used as the blowing agent in a frothing process.

A surfactant is also used when a polyurethane foam is prepared. A wide variety of silicone surfactants as are commonly used in making polyurethane foams can be used in making the foams in accordance with this invention. Examples of such silicone surfactants are commercially available under the tradenames Tegostab™ (Th. Goldschmidt and Co.), Niax™ (GE OSi Silicones) and Dabco™ (Air Products and Chemicals). A preferred type of silicone surfactant for slabstock foam formulations has a siloxane backbone containing a mixture of high atomic mass polyoxyalkylene pendant groups have an average atomic mass of from about 1400 to about 6000. The silicone backbone preferably also contains low atomic mass polyoxyalkylene pendant groups having an average atomic mass of from about 300 to about 750. It is more preferred that the silicone backbone contains both high and low atomic mass polyoxyalkylene pendant groups which, taken together, have an average atomic mass of from 1000 to 2000, especially from 1100 to 1800. The silicon surfactant preferably contains from 45 to 360, especially from 90 to 260, silicone repeating units/molecule. Preferably, from 6 to 30% of such silicon repeating units contain a pendant high or low atomic mass polyoxyalkylene group. Surfactants of these types are described, for example, in U.S. Pat. No. 5,145,879 and EP 0 712 884 B1, both incorporated by reference. From 1 to 6, preferably from 2 to 4 parts by weight of such surfactants are suitably used per 100 parts by weight high equivalent weight polyols.

The preferred silicon surfactants for high water/high hydroxymethylated polyol slabstock foam applications can be represented by the formula $MD_xD'_yM$, wherein:

each M is independently $(CH_3)_3SiO_{1/2}$ or $R(CH_3)_2SiO_{1/2}$;

D is $(CH_3)_2SiO_{1/2}$;

D' is $R(CH_3)SiO_{2/2}$;

x is 40-220, especially 85-220 y is 5-40, especially 8-40, with x/y<10; and each R is independently a high atomic mass polyether group or a low atomic mass polyether group, provided that a sufficient number of R groups are high atomic mass polyether groups that the average atomic mass of all polyether groups is at least 1000, especially at least 1100. High atomic mass polyether groups R preferably have the structure $-(CH_2)_n(C_2H_4O)_a(CH_2CH(CH_3)O)_bR'$, in which n is about 3 to 10, a and b are such that ethylene oxide residues (i.e., $-C_2H_4O-$ groups) constitute from 30 to 100%, especially 30-50% by weight of the R group and the atomic mass of the R group is about from 1400 to 6000, especially from 3500 to 5000, and R' is hydrogen, alkyl, $-C(O)R''$, $-C(O)OR''$, or $-C(O)NHR''$, where R'' is a monofunctional alkyl or aryl group. Low atomic mass polyether groups R preferably have the structure $-(CH_2)_n(C_2H_4O)_n(CH_2CH(CH_3)O)_bR'$, in which n is about 3 to 10, a and b are such that that ethylene oxide residues constitute from 30 to 100% by weight of the R group, the atomic mass of the R group is from 300 to 750, and R' is as defined before.

Those surfactants in which x and y are particularly high (such as an x value of 85 or more and a y value of 8 or more in the structure above) tend to have very high viscosities and therefore may mix poorly into the remaining components of the foam formulation. This problem can be overcome by thinning the surfactant with a diluent such as an aliphatic hydrocarbon, aromatic hydrocarbon, ethoxylated phenol, alkylene benzene, polyether polyol, dipropylene glycol, and the like. Sufficient diluent is preferably used to bring the viscosity of the surfactant blend to below 3000 cP at 25° C.

Two silicone surfactants of particular interest in high water, high hydroxymethylated slabstock foam formulations are Niax™ L-626 and Niax™ L-5614 surfactants, both available from GE OSi Silicones. These materials are high molecular weight silicone surfactant/diluent blends.

A polyurethane is formed by bringing the components of the reaction mixture together under conditions that they react and form a polyurethane polymer. A wide variety of polyurethane-forming processes can be used, including so-called slabstock foam processes, molded foam processes, reaction injection molding processes, cast elastomer processes, lamination processes, frothed foam process, carpet backing processes, and the like. Curing conditions may vary somewhat depending on whether a hydroxymethyl-containing fatty acid or fatty ester material is used. The polyurethane products will be in most instances elastomeric materials that may be non-cellular, microcellular or foam.

A hydroxymethyl-containing fatty acid contains both hydroxyl and carboxylic acid groups, both of which can react with isocyanate groups to form a covalent bond and thereby build molecular weight. These reactions usually occur simultaneously with the reaction of the polyisocyanate with the polyol, polyamine or aminoalcohol compound, and simultaneously with that of the polyisocyanate with water, if water is present. Accordingly, no special conditions are needed in most cases to form a high molecular weight polyurethane having good properties. In this case, the amount of polyisocyanate used is sufficient to provide an isocyanate index, i.e. 100 times the ratio of NCO groups to isocyanate-reactive groups in the reaction mixture (including those provided by water if used as a blowing agent), of from 85 to 150, especially from 95 to 115. If it is desired to form isocyanurate groups in the polymer, a higher isocyanate index can be used.

A hydroxymethyl-containing fatty acid ester reacts with the polyisocyanate only through its hydroxyl groups. However, the ester group can engage in transesterification and or amidization reactions with the polyol, polyamine and aminoalcohol compounds that are present in the reaction mixture. Because the isocyanate groups will compete with the fatty acid ester groups to react with hydroxyl or amine groups provided by the polyol, polyamine or aminoalcohol compound, it is sometimes desired to use a somewhat lower isocyanate index in these cases. This allows amino and/or hydroxyl groups to remain available for reaction with the fatty acid ester groups. In most applications, the isocyanate index will typically range from about 50 to about 125, especially from about 70 to about 95.

When a hydroxymethyl-containing fatty acid ester is used, it is generally preferred to include a catalyst in the reaction mixture that promotes the reaction of the ester with hydroxyl and/or amino groups. A wide variety of such catalysts are known and can be used herein, provided that they do not interfere with the urethane-forming reactions. Tin- or titanate-based polymerization catalysts are of particular interest. Examples of such catalysts are described in U.S. Pat. No. 5,498,651 and U.S. Pat. No. 5,547,984, the disclosures of which are incorporated herein by reference.

Illustrative examples of classes of tin compounds that may be used in the invention include monoalkyltin hydroxide oxides, monoalkyltinchloride dihydroxicles, dialkyltin oxides, bistrialkyltin oxides, monoalkyltin trisalkoxides, dialkyltin dialkoxides, trialkyltin alkoxides and the like. It will be recognized that in many cases organotin catalysts are also useful polyurethane catalysts. In a preferred embodiment of the invention, the reaction mixture contains at least one organotin catalyst cart is active as both a urethane catalyst and a transesterification or amidization catalyst.

The urethane-forming reactions (as well as the water-isocyanate reaction) often proceed well even at room temperature, and are usually exothermic enough to drive the polyurethane-forming reactions nearly to completion. The transesterification and amidization reactions, on the other hand, tend to require elevated temperatures to proceed. In some applications, such as the formation of slabstock foam and high resilience slabstock foam, the heat generated in the polyurethane-forming reaction can generate temperatures sufficiently high to drive the transesterification and/or amidization reactions. In these cases, the generally large size of the foam buns that are produced limits the escape of heat and therefore creates internal temperatures that remain high for significant periods of time. In other applications, such as molded foams and elastomer production, the polymer may be postcured for a period of minutes to hours at an elevated temperature of from 50 to 150° C. to complete the transesterification or amidization reaction. Because the transesterification and amidiziation reactions will produce an alkanol by-product, it may be desirable to remove the alkanol as it forms in order to help drive the reactions toward completion.

In general, a polyurethane foam is prepared by mixing the polyisocyanate and isocyanate-reactive materials in the presence of the blowing agent, surfactant, catalyst(s) and other optional ingredients as desired, under conditions such that the polyisocyanate and isocyanate-reactive materials react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is in a second step reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock foam processes, high resiliency slabstock foam processes, and molded foam methods.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about 1 to about 5 pounds per cubic foot (pcf) (16-80 kg/m$^3$) in density, especially from about 1.2 to about 2.0 pcf (19.2-32 kg/m$^3$).

High resilience slabstock (HR slabstock) foam is made in methods similar to those used to make conventional slabstock foam. HR slabstock foams are characterized in exhibiting a rebound score of 55% or higher, per ASTM 3574-03. These forms tend to be prepared using somewhat higher catalyst levels, compared to conventional slabstock foams, to reduce energy requirements to cure the foam. HR slabstock foam formulations blown only with water tend to use lower levels of water than do conventional slabstock formulations and thus produce slightly higher density foams. Water levels tend to be from about 2 to about 3.5, especially from about 2.5 to about 3 parts per 100 parts high equivalent weight polyols. Foam densities are typically from about 2 to about 5 pcf (32 to 80 kg/m$^3$), especially from about 2.1 to about 3 pcf (33.6-48 kg/m$^3$).

Molded foam can be made according to the invention by transferring the reactants (isocyanate-reactive materials (including the hydroxymethyl-containing fatty acid or ester), polyisocyanate, blowing agent, and surfactant) to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam. Densities for molded foams tend to be in the range of 2.0 to about 5.0 pounds per cubic foot (32-80 kg/m$^3$).

The invention is also useful in making foam via a mechanical frothing process. In such processes, air, nitrogen or other gas is whipped into a reacting mixture containing the isocyanate reactive materials, a polyisocyanate, and optionally catalysts, surfactants as described before, and other components. The frothed reaction mixture is then typically applied to a substrate where it is permitted to cure to form as adherent cellular layer. A frothing application of particular importance is the formation of carpet with an attached polyurethane cushion. Such carpet-backing processes are described, for example, in U.S. Pat. Nos. 6,372,810 and 5,908,701. Another frothing application is in the manufacture of microcellular elastomers, such as for shoe soles.

Polyurethane foam made in accordance with the invention is useful as furniture cushioning, automotive seating, automotive dashboards, packaging applications, other cushioning and energy management applications, carpet backing, gasketing, and other applications for which conventional polyurethane foams are used. Polyurethane elastomers are useful as furniture and vehicle wheels, casters, automotive fascia, and other synthetic rubber applications.

EXAMPLES 1 AND 2

The following general procedure is used to make a dispersion of styrene-acrylonitrile particles in methylhydroxymethyl stearate.

A reactor is preheated to 60° C. and charged with an initial charge of methylhydroxymethyl stearate (MHMS) and a stabilizer compound. The stabilizer compound is a 8,000-15,000 number average molecular weight polyether polyol having induced ethylenic unsaturation and free hydroxyl groups. The reactor is then heated under vacuum to 125° C. The vacuum valve is then closed, resulting in a pressure inside the reactor of about 0.1 bar. The comonomers (styrene and acrylonitrile at a 70/30 weight ratio) are mixed with additional MHMS, free radical initiator (azobis(methylbutyronitrile) and dodecanthiol. This comonomer mixture is fed into the reactor over a period of 60-90 minutes while maintaining the reactor temperature at 125° C. After this comonomer blend addition is complete, a mixture of azobis(methylbutyronitrile) and MHMS is fed into the reactor over a 30 minute period. The reaction mixture is then held at 125° C. for an additional 30 minutes, cooled to 40° C., and stored. A sample is taken for free monomer analysis and filtration. The remainder is stripped to remove residual monomers and then further analyzed. Results are as indicated in Table 1.

TABLE 1

| Ingredient/Property | |
|---|---|
| Initial Charge, parts | |
| Stabilizer A | 73.56 |
| MHMS | 120.57 |
| Comonomer blend | |
| Styrene | 280 |
| Acrylonitrile | 120 |
| AMBN | 1.62 |
| Dodecanethiol | 4.05 |
| MHMS | 169.13 |
| Post-monomer blend | |
| AMBN | 1.07 |
| MHMS | 30 |
| Nominal Solids, % | 50 |
| Residual Styrene, wt.-% | 0.22 |
| Residual Acrylonitrile, wt.-% | 0.44 |
| Filterability, 35 μm, 300 seconds, % | 100 |
| Viscosity, 25° C., Cone/cup 100 s$^{-1}$, mPa·s | 5000 |
| Particle size D[4,3] | 1.7 |

Polyurethane foams are prepared using this dispersion in a formulation as set out in Table 2.

TABLE 2

| | Parts By Weight | |
|---|---|---|
| Ingredient | Example 1 | Example 2 |
| EO-capped Polyether polyol | 18.75 | 0 |
| Dispersion from above | 18.75 | 37.5 |
| Polyether polyol | 62.5 | 62.5 |
| Diethanol amine | 1.6 | 1.6 |
| Amine catalyst | 0.35 | 0.35 |
| Organotin catalyst | 0.08 | 0.08 |
| Water | 4.2 | 4.2 |
| Surfactant | 1.2 | 1.2 |

Both formulations foam well to form good quality polyurethane foam. Physical properties of the foams are measured and are as reported in Table 3. Compression sets, resiliency, tear strength, tensile strength, elongation, modulus, density and airflow are measured according to ASTM D379495. Mean load at 65% deflection is measured according to ISO 243-97.

TABLE 3

| | Value | |
|---|---|---|
| Property | Ex. 1 | Ex. 2 |
| 50% Compression Set, % | 16 | 41 |
| 50% Humid Age Compression Set, % | 32 | 41 |
| 75% Compression Set, % | 62 | 72 |
| 75% Humid Age Compression Set, % | 56 | 66 |
| Resiliency, % | 38 | 29 |
| Elongation at Break, % | 60 | 58 |
| Tear Strength lb/in (N/m) | 1.60 (28.6) | 1.50 (26.8) |
| Tensile Strength, psi (kPa) | 15 (103) | 13 (90) |
| Mean Load at 65% Deflection, lb (N) | 121 (538) | 125 (556) |
| Mean Modulus | 3 | 3 |
| Hysteresis, % | 67 | 50 |
| Density, pcf (kg/m$^3$) | 1.9 (30.4) | 2.1 (33.2) |
| Airflow, ft$^3$/min (L/s) | 1.29 (0.61) | 1.18 (0.56) |

What is claimed is:

1. A process for preparing a polyurethane, comprising forming a reaction mixture comprising at least one polyisocyanate, a fatty acid having an average of at least 0.8 hydroxymethyl group per molecule and a terminal carboxylic acid group, and at least one polyol, polyamine or aminoalcohol compound, and curing the reaction mixture to form a polyurethane polymer.

2. The process of claim 1, wherein the fatty acid contains 10 to 26 carbon atoms.

3. The process of claim 2, wherein the fatty acid is a mixture of materials selected from materials having structures A1, A2, A3, A4 and A5, wherein A1 is:

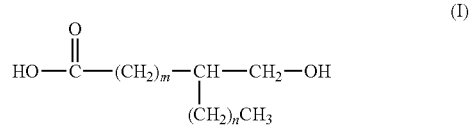

wherein m is number greater than 3, n is greater than or equal to zero and m+n is from 8 to 22, A2 is:

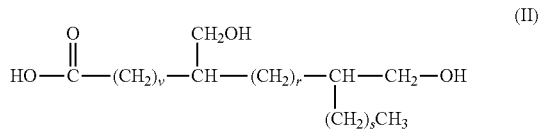

(II)

wherein v is a number greater than 3, r and s are each numbers greater than or equal to zero with v+r+s being from 6 to 20, A3 is:

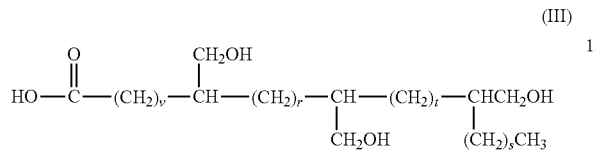

(III)

wherein v, each r and s are as defined before, t is a number greater than or equal to zero, and the sum of v, r, s and t is from 5 to 19, A4 is

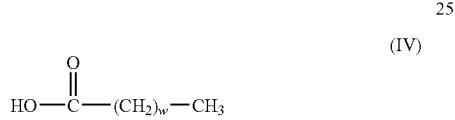

(IV)

where w is from 10 to 24, and A5 is

(V)

where R' is a linear or branched alkyl group that is substituted with at least one cyclic ether group and optionally one or more hydroxyl groups or other ether groups.

4. The process of claim 3, wherein the reaction mixture contains an adduct of a tertiary amine catalyst and at least a portion of the fatty acid, which adduct is a delayed action or heat-activated catalyst.

5. A process for preparing a polyurethane, comprising forming a reaction mixture comprising at least one polyisocyanate, an unsubstituted alkyl ester of a fatty acid having an average of at least 0.8 hydroxymethyl group per molecule and having 12 to 26 carbon atoms, and at least one polyol or polyamine compound, and curing the reaction mixture to form a polyurethane polymer, wherein the alkyl ester of the fatty acid is a mixture of materials selected from materials having structures A1, A2, A3, A4 and A5, wherein A1 is:

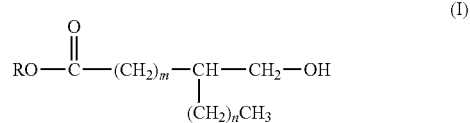

(I)

wherein R is an unsubstituted alkyl group, m is number greater than 3, n is greater than or equal to zero and m+n is from 8 to 22, A2 is:

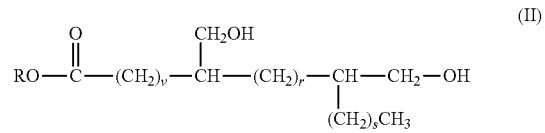

(II)

wherein R is as before, v is a number greater than 3, r and s are each numbers greater than or equal to zero with v+r+s being from 6 to 20, A3 is:

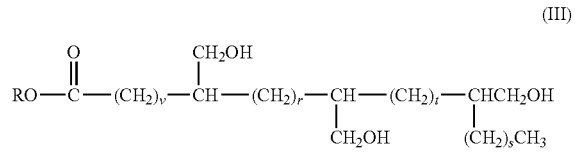

(III)

wherein R, v, each r and s are as defined before, t is a number greater than or equal to zero, and the sum of v, r, s and t is from 5 to 18, A4 is

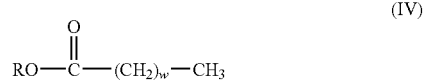

(IV)

where R is as before and w is from 10-24, and A5 is

(V)

where R is as before and R' is a linear or branched alkyl group that is substituted with at least one cyclic ether group and optionally one or more hydroxyl groups or other ether groups.

6. The process of claim 3, wherein the polyol, polyamine or aminoalcohol includes a polyether or polyester polyol having an equivalent weight of at least 400.

7. The process of claim 3, wherein the polyol, polyamine or aminoalcohol includes at least one material having an equivalent weight of from 30 to 200.

8. The process of claim 5, wherein the reaction mixture contains at least one catalyst that catalyzes a urethane-forming reaction and a transesterification or amidization reaction.

9. The process of claim 3, wherein the reaction mixture contains at least one organotin catalyst.

10. The process of claim 8, wherein the polyurethane polymer is post cured at an elevated temperature to form ester and/or amide groups between the ester group of the hydroxymethyl-containing fatty acid ester and an amino or hydroxyl group of the polyol, polyamine or aminoalcohol.

11. The process of claim 3, wherein the reaction mixture contains a blowing agent, and the polyurethane polymer is cellular.

12. The process of claim 3, wherein the polyurethane polymer is elastomeric.

13. The process of claim 5, wherein the polyol or polyamine compound includes a polyether or polyester polyol having an equivalent weight of at least 400.

14. The process of claim 5, wherein the polyol or polyamine compound includes at least one material having an equivalent weight of from 30 to 200.

15. The process of claim 5, wherein the reaction mixture contains at least one organotin catalyst.

16. The process of claim 5, wherein the reaction mixture contains a blowing agent, and the polyurethane polymer is cellular.

17. The process of claim 5, wherein the polyurethane polymer is elastomeric.

* * * * *